Nov. 29, 1938.　　S. A. COGSDILL　　2,138,727

CUTTING TOOL

Filed April 6, 1936

INVENTOR
STUART A. COGSDILL
BY
ATTORNEYS

Patented Nov. 29, 1938

2,138,727

UNITED STATES PATENT OFFICE 2,138,727

CUTTING TOOL

Stuart A. Cogsdill, Detroit, Mich.

Application April 6, 1936, Serial No. 73,007

5 Claims. (Cl. 77—75.5)

The invention relates to cutting tools and refers more particularly to cutting tools of the inserted blade type.

The invention has for one object to provide an improved construction of inserted blade type cutting tool having an improved means for securing the blade or blades in place. The invention has for another object to provide a construction of cutting tool in which the blade or blades are adjustable and may be firmly secured in adjusted positions.

The invention has for a further object the novel arrangement and combinations of parts as more fully hereinafter set forth.

Figure 2:
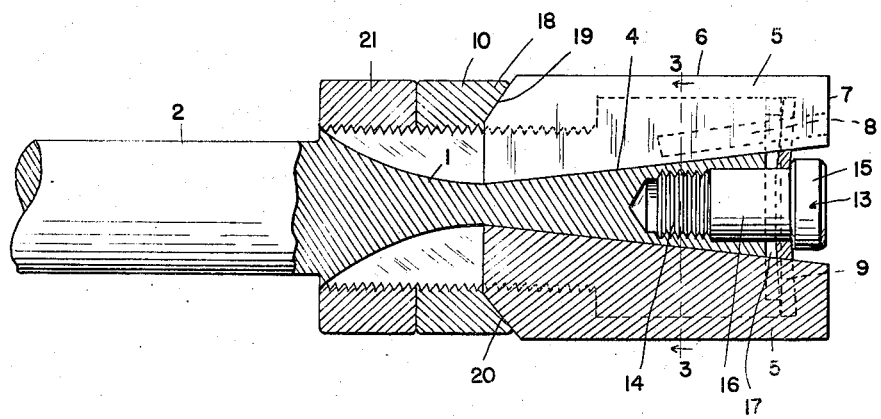
Figure 2 is a cross section on the line 2—2 of Figure 1.
Figure 1:
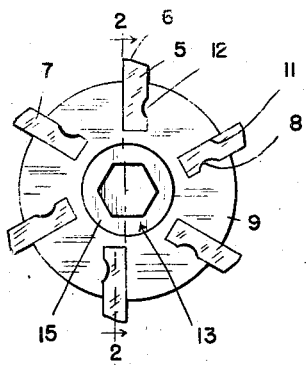
Figure 1 is an end elevation of a cutting tool showing an embodiment of my invention.
Figure 3:
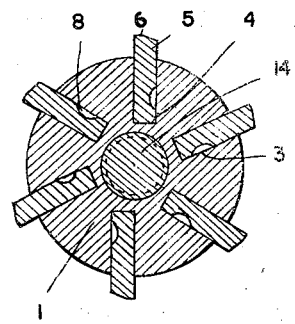
Figure 3 is a cross section on the line 3—3 of Figure 2.

While the invention is applicable to various cutting tools of the inserted blade type, such as reamers, milling cutters, counterbores, hones and the like, the invention in the present instance is illustrated embodied in a reamer.

1 is the body of the reamer and 2 the shank at one end of the body. The body is formed with the angularly spaced longitudinally extending grooves 3, the bottoms 4 of which are inclined relative to the axis of the body. More specifically, the portions of the bottoms which are adapted to form seats for the cutting blades diverge toward the free end of the body. As shown in the present instance, the grooves extend parallel to radial planes through the body and their side walls are parallel. 5 are cutting blades which closely fit within the grooves and which have inner edges for engaging the seats formed by the bottoms of the grooves. These inner edges have the same inclination as the seats and their radially outer edges 6 are parallel to the axis of the body. These radially outer edges and also the free end edges 7 may both be used for cutting, or either may be used.

Each of the blades 5 has in one of its sides the generally longitudinally extending groove 8 which extends from near the middle of each blade to its free end and which is parallel to the radially inner edge of the blade. 9 is a flexible or contractible member at the free end of the body 1 and 10 is a collar threaded upon the body 1 at the end of the blades remote from the member 9, both of which serve to secure or clamp the blades against their seats upon the body.

The member 9 is in the nature of a spring steel washer which is provided with grooves 11 corresponding to the grooves 3 in the body. Extending from a side wall of each groove is the projection 12 adapted to fit the recess 8 of the associated blade.

For positioning and securing the member 9, there is the lock screw 13 which extends axially within the free end of the body 1 and has the end portion 14 for threadedly engaging the body, the head portion 15 for abutting the member 9 and the cylindrical intermediate portion 16 closely fitting the bore within the body and closely engaged by the edge of the central or axial openings in the member 9. The recesses 8 and the projections 12 form in effect shoulders with the shoulders formed by the projections 12 radially outwardly of the shoulders formed by the recesses 8 so that upon drawing radially inwardly the projections 12, the free end portions of the blades will be clamped against their respective seats. This relative movement is effected by contracting the member 9 and is secured by axially flexing this member by means of the screw 13. This is provided for by forming the free end of the body 1 with the central recess 17 having a diameter slightly less than the diameter of the body so that an annular wall is provided upon the free end of the body for abutting the peripheral portion of the member 9 while the remainder of this member 9 may be flexed into the recess.

The collar 10 is formed with the overhanging end portion 18 which provides the frusto-conical internal seat 19 for engaging the adjacent and correspondingly inclined ends 20 of the blades 5. It will thus be seen that the collar also functions to clamp the adjacent end portions of the blades against the seats on the body. A suitable lock collar 21 may also be provided, this collar being threaded upon the body and being adapted to abut the collar 10.

With the parts in the position as shown in Figure 2, if it is desired to grind the cutting edges of the cutting blades, the lock screw 13 and the lock collar 21 may be loosened, after which the clamping collar 10 may be turned down upon the body to adjust the blades longitudinally of their respective seats toward the free end of the body to thereby move the blades radially outwardly to the desired extent. The screw 13 may then be tightened up so that the blades will be securely locked in place and the lock collar may also be tightened up to prevent accidental release of the clamping pressure. The blades may then be ground to the desired size, it being noted that the external diameter of the blades is greater than the external diameter of the clamping member 9, the clamping collar 10 and the lock collar 21.

What I claim as my invention is:

1. In a cutting tool, the combination with a body having angularly spaced longitudinally extending seats, blades engaging said seats, a flexible member having grooves for receiving said blades, said blades having generally axially extending grooves, said flexible member having shoulders with the shoulders of said flexible member engageable with the grooves of said blades, and means upon said body for securing said flexible member to said body and for also flexing said flexible member to contract the same and to clamp said blades against said seats.

2. In a cutting tool, the combination with a body having angularly spaced longitudinally extending grooves with their bottoms forming seats, blades engaging said seats, a flexible member having grooves for receiving said blades, said blades having generally axially extending grooves, said flexible member having shoulders engageable with the grooves of said blades, and means upon said body for securing said flexible member to said body and for also flexing said flexible member to contract the same and to clamp said blades against said seats.

3. In a cutting tool, the combination with a body having angularly spaced longitudinally extending grooves with their bottoms inclined relative to the axis of said body and forming seats, blades extending within said grooves and engaging said seats and adjustable longitudinally thereof, said blades having grooves near one end thereof extending parallel to said seats, a spring steel washer at one end of said body having grooves for receiving said blades, one edge of each washer groove being formed with a projection engaging a groove in the associated blade, means for securing said washer to said body and for distorting said washer to clamp said blades against said seats, and a collar threaded upon said body and engaging said blades remote from said washer and adapted to clamp said blades against said seats.

4. In a cutting tool, the combination with a body having angularly spaced longitudinally extending seats and having a recess in one end thereof, blades engaging said seats, said blades having shoulders, a flexible member having shoulders engaging said first mentioned shoulders and located radially outwardly thereof, said flexible member bridging the recess in said body and having outer portions engaging said body, and means upon said body for securing said flexible member to said body and for also flexing said flexible member into said recess to contract said flexible member and to clamp said blades against said seats.

5. In a cutting tool, the combination with a body having angularly spaced longitudinally extending grooves with their bottoms inclined relative to the axis of said body and forming seats, blades extending within said grooves and engaging said seats and adjustable longitudinally thereof, a contractible member having grooves for receiving said blades, said blades and contractible member having shoulders with the shoulders of said contractible member radially outwardly of the shoulders of said blades, said body having an annular projection at one end thereof engageable with said contractible member, and means upon said body for securing said contractible member to said body and for distorting said contractible member to clamp said blades against said seats.

STUART A. COGSDILL.